C. H. PHILLIPS.
FLUSHING VALVE FOR WATER CLOSETS.
APPLICATION FILED APR. 10, 1908.
1,102,543.
Patented July 7, 1914.
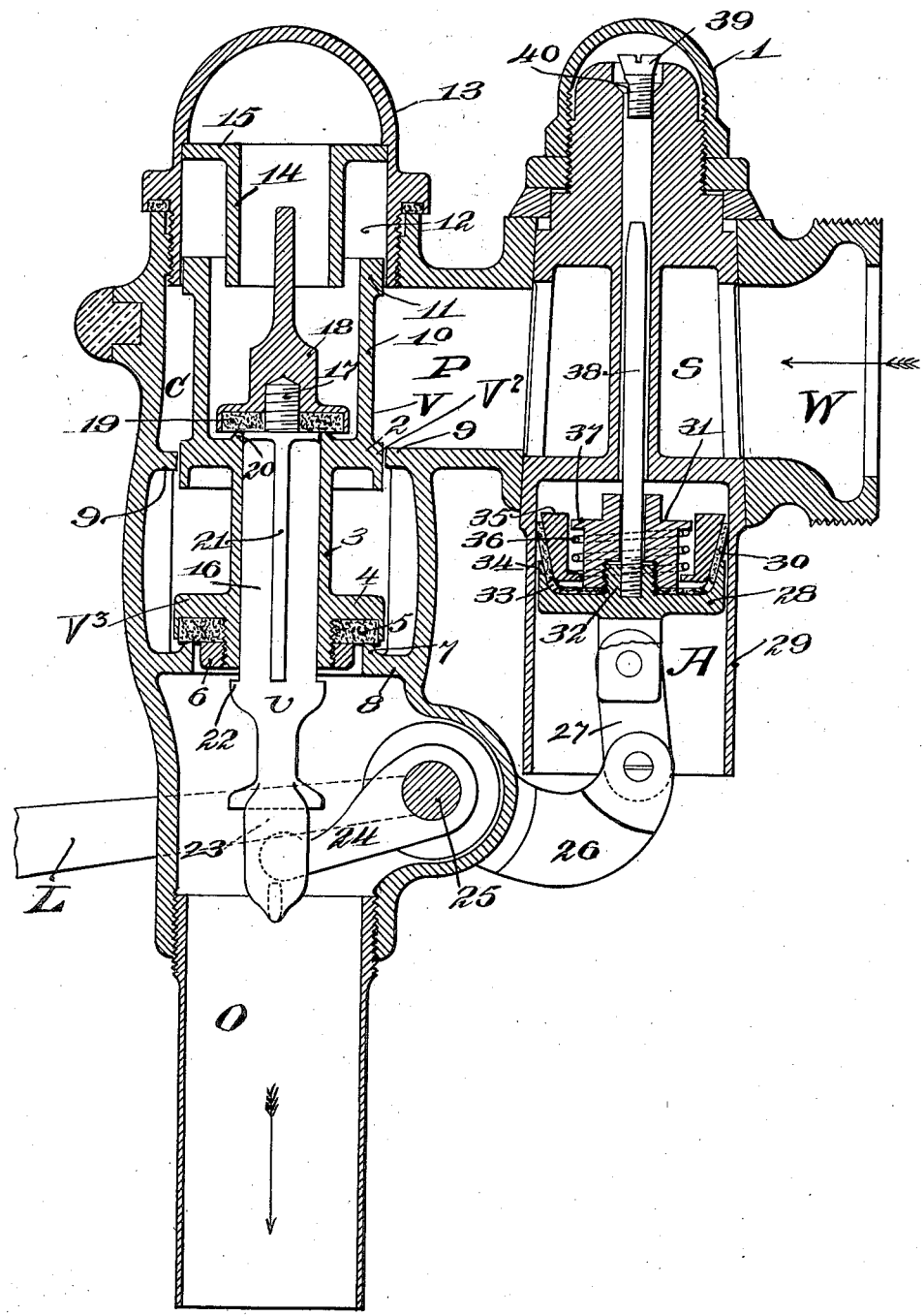
Witnesses.
Edward S. Fray
Alice Acker
Inventor
Charles H. Phillips
by his Attorneys
Phillips Van Ornum & Fish

UNITED STATES PATENT OFFICE.

CHARLES H. PHILLIPS, OF MAPLEWOOD, MASSACHUSETTS, ASSIGNOR TO PHILLIPS FLUSHING TANK COMPANY, OF PORTLAND, MAINE, A CORPORATION OF MAINE.

FLUSHING-VALVE FOR WATER-CLOSETS.

1,102,543.  Specification of Letters Patent.  Patented July 7, 1914.

Application filed April 10, 1908. Serial No. 426,234.

*To all whom it may concern:*

Be it known that I, CHARLES H. PHILLIPS, a citizen of the United States, residing at Maplewood, in the county of Middlesex and State of Massachusetts, have invented certain new and useful Improvements in Flushing-Valves for Water-Closets; and I do hereby declare the following to be a full, clear, and exact description of the invention, such as will enable others skilled in the art to which it appertains to make and use the same.

The present invention relates to an improvement in flushing valves for water closets.

This invention consists in an improved construction of the apparatus described in the patent to Phillips, No. 929,007, dated July 27, 1909.

The object of the invention is to improve the construction and operation of the valve of the said application, particularly with respect to the air check and the water valve.

The accompanying drawing is a sectional elevation of the preferred form of the valve.

The valve, illustrated in the accompanying drawing, is described as follows:—The water enters through the service pipe W, passes through the shut-off cock S into the passageway P, from which it passes into the valve chamber C and thence, when the service valve V is raised, to the outlet O. The valve is opened by a hand lever L (weighted at its end) which is connected with the relief valve *v* carried by the valve V. The service valve V comprises a preliminary valve V² and a main valve V³, the former acting first to throttle the bulk of the stream and the latter acting later to complete the valve closure. The operation of the service valve is controlled by means of a water check integral with it and an air check A connected with it through the medium of the hand lever L and parts associated therewith.

Proceeding now to a description of the details of construction, the shut-off cock S is similar in general construction to the shut-off cock of the said application, except that its upper end is provided with a cover 1 which is screwed over the otherwise exposed regulating screw for the air check hereinafter referred to. The cap does not fit tightly over the regulating screw.

The valve V consists of the disk 2 which is united by the cylindrical stem 3 with the disk 4 which carries the packing ring 5 which is secured in place by the nut 6 in a cavity in the lower side of the disk 4. The packing ring 5 is adapted to engage the main valve seat 7 supported upon the diaphragm 8 extended inwardly from the walls of the valve chamber. The valve disk 2 loosely fits an opening in the diaphragm 9, which is projected inwardly from the walls of the valve chamber above the diaphragm 8. This valve is the preliminary throttling valve. The valve chamber C between the diaphragms 8 and 9 is provided with guide ribs to preserve the alinement of the valve. From the upper surface of the disk 2 the enlarged cylindrical stem 10 rises, which carries upon its upper end the water check piston 11 which loosely fits the water check cylinder 12. This water check cylinder 12 is formed in a cap 13 which is screw threaded into an opening in the upper end of the valve chamber C. The water check cylinder 12 and the opening in the diaphragm 9 receiving the valve disk 2 are of the same size, so that so far as these are concerned they are balanced. Inside of the cap 13 there is provided a thimble 14 which depends from the disk 15 forced into the water check cylinder 12. The function of this thimble will be referred to in connection with the operation. The relief valve *v* has a winged stem 16 provided at its upper end with a screw threaded projection 17 which is screwed into the relief valve member 18 which carries the relief packing ring 19. The upper surface of the valve disk 2 is provided with a valve seat 20, upon which the relief valve seats. The wings 21 and the valve stem 16 loosely fit the inside of the hollow valve stem 3, and are provided at their lower ends with shoulders 22 which are adapted to engage the under side of the valve stem 3. The lower end of the valve stem 16 is provided with a recess 23 which receives the end of the valve operating arm 24 secured to the handle shaft 25, which passes out through a stuffing box in the side of the valve body, and has secured upon its end the hand lever L. Also secured to the handle shaft 25 on the outside of the casing is the air check arm 26, which is connected by means of the link 27 with the air check piston 28.

The air check comprises a cylinder 29 within which the air check piston 28 moves.

The air check piston is provided with a cup leather 30 which is secured at its center between the nut 31 and the piston 28, the nut being screwed on to a screw threaded boss 32 rising from the center of the air check piston 28. The cup leather 30 is provided with one or more holes 33 located at the angle of the cup. The air check piston is provided at its edge with an upturned lip 34 which surrounds and supports the lower portion of the vertical part of the cup leather. A follower 35, frusto-conical in form, inside the cup leather 30, serves to hold the edges of the cup leather against the walls of the air check cylinder 29. This follower 35 is provided with a cylindrical opening extending from the top nearly through it, but at the lower end of this hole the follower is provided with an inturned lip or shoulder upon which the lower end of the follower spring 36 is adapted to rest. The upper end of the follower spring is engaged by a flange 37 projected outwardly from the upper end of the nut 31. This air check construction, so far as described, operates, when the air check piston is pulled down in the air check cylinder, so that the cup leather 30 lifts from the lip 34 of the air check piston, and permits the ingress of air to the upper side of the piston by passing around the upper edge of the lip 34 and through the cup leather holes 33. When the air check piston is raised, however, the friction of the cup leather against the walls of the air check cylinder 29 causes the leather to be engaged by the lip 34 of the air check piston, thereby pressing the cup leather against the lip 34 and closing the holes 33, and preventing egress of air from the upper side of the air check piston to the lower. The air check piston is provided with a long stem 38 which is screwed at its lower end into a recess in the boss 32, and projects up into a hole in the center of the shut-off cock S. The spindle 38 fits this hole loosely, so as not to impede the flow of air therethrough. The upper end of the hole in the shut-off cock S is provided with a regulating screw 39 which is cut away on one side on an angle, as at 40, so that the amount of opening to allow the escape of air from the upper side of the air check may be increased or diminished at will. The cap 1 prevents the user from tampering with the regulating screw 39 after it has been properly adjusted by the plumber. By providing the air check with the spindle 38, the tipping of the air check piston in the air check cylinder is prevented, and consequently its alinement is securely maintained.

The operation and use of the above described valve is as follows:—When it is desired to open the valve to flush the closet the lever L is raised. This first lifts the relief valve $v$ from its seat and relieves the pressure exerted upon its upper surface by the water which has practically free access to the upper side of the main valve. Next the shoulders 22 of the relief valve engage the lower edge of the valve stem 3, and the whole valve V is raised, first to lift the main valve disk 4 from its seat, and then to lift the preliminary throttling valve 2 above the level of the diaphragm 9, so that a free passage is secured for the flow of water through the opening in the diaphragm 9 and through the main valve opening in the diaphragm 8 to the outlet O. During the lifting of the valve V the air check piston 28 was pulled down in the air check cylinder 29 and the holes in the cup leather were opened to permit the free ingress of air to the upper side of the air check piston. The handle, after the opening of the valve is completed, is immediately released, and thereupon the closing operations begin. The friction of the water in passing around the main valve disk 4 and the weight of the handle tends to force the valve body V downward. The downward movement of the valve body V is resisted by the air check through the connections described, the relief valve $v$ being held open the while. In shutting off the water, the first interruption of its flow is secured by the entrance of the throttling valve disk 2 into the opening in the diaphragm 9. This valve disk, however, does not accurately fit this opening, and water continues to flow between the valve disk 2 and the walls of the opening in the diaphragm 9, thereby exerting a pressure upon the upper side of the valve disk 4, tending to force the valve body V down to its seat. The relief valve $v$ is still maintained open since the valve stem 16 still rests upon the arm 24, and as a consequence the leakage from the pipe P to the water check chamber does not build up a pressure upon the upper side of the valve. At the time that the preliminary throttling valve is closed by the entrance of the lower edge of the disk 2 into the hole in the diaphragm 9, the main valve 4 is still a considerable distance above its seat, but it continues to fall as fast as the egress of air from the upper side of the air check piston by the regulating screw 39 permits. Next the main valve comes into engagement with its seat 7, but this closure is slow and does not cause any severe shock, because its motion to its seat is impeded by the slow upward movement of the air check, and the further impediment offered by the necessity for water to flow around the edge of the water check piston 11 into the water check cylinder 12. The main valve therefore comes to its seat without shock, and thereafter the relief valve is closed by the further yielding of the air check, and the flow of water into the water check cylinder by the edge of the water check piston 11.

The function of the thimble 14 is not perfectly understood. Its presence, however, is known to contribute to a more perfect operation of the water check. It is believed that it operates to confine the air in the water check chamber in such a way as to increase the size of the air bubble therein, and as a consequence, to increase the rigidity of operation of the water check.

The construction illustrated in the drawing is easily assembled and taken apart. For instance, in order to remove the valve body V, all that is necessary to be done is (first closing the shut-off cock S, of course) to unscrew the cap 13, when the fingers may be inserted in the hole in the upper part of the valve casing, and the projection on the upper end of the relief valve may be taken hold of with the fingers, and raising the hand lever L with one hand, the valve body may then be lifted out. The packing on the relief valve may be replaced by unscrewing the relief valve member 18 from the threaded boss on the end of the relief valve stem. The packing on the main valve may be replaced by unscrewing the nut 6 from the projection on the lower end of the valve stem 3 without removing the relief valve, as the opening in the nut exceeds in diameter the distance across the shoulders 22. The air check piston is easily removed by unscrewing the screw upon which the lower end of the link 27 is pivoted, after which the piston may be withdrawn from the air check cylinder, and the cup leather or spring renewed if desired. The piston is again easily inserted, the lower edge of the air check cylinder being beveled to guide the cup of the washer into place.

Having thus described the invention, what is claimed is:—

1. A flushing valve, having, in combination, a main valve having a surface exposed to water under pressure tending to close the valve, a restricted passage for carrying water under pressure to said surface, a relief valve having an opening larger than said restricted passage for relieving the water pressure on said surface, means for opening the relief valve before the opening of the main valve and for preventing the relief valve from closing before the closing of the main valve, substantially as described.

2. A flushing valve having, in combination, a main valve adapted to be normally closed by the pressure of the water, a throttling valve connected with the main valve to move therewith and adapted to always allow a slight flow of water to the main valve and to allow a relatively large flow of water to the main valve when the main valve is entirely open, a relief valve constructed to allow a preliminary flow of water before the opening of the main valve, means permitting a restricted flow of water to the relief valve, and means for insuring a slow closing of the main valve operating to retain the relief valve in its open position during the closing of the main valve, substantially as described.

3. A flushing valve, having, in combination, a piston carrying a main valve, a chamber for receiving one end of the piston, a restricted passage for carrying water under pressure into said chamber, the water pressure tending to close the main valve, a relief valve adapted to discharge water from said chamber, means for opening the relief valve before the opening of the main valve and for preventing the relief valve from closing until after the closing of the main valve, substantially as described.

4. A flushing valve, having, in combination, a piston carrying a main valve, one end of the piston being exposed to water under pressure tending to close the main valve, means permitting a restricted flow of water under pressure to said piston end, a relief valve constructed to allow a preliminary flow of water before the opening of the main valve to relieve the pressure on said piston end, and means for insuring a slow closing of the main valve, said means being adapted to retain the relief valve in its open position during the closing of the main valve, substantially as described.

5. A flushing valve, having, in combination, a main valve, a water check comprising a hollow piston connected to and moving with the main valve, a downwardly opening piston chamber closed at the top and loosely receiving the piston, a thimble secured in said chamber having its upper end imperforately closed by the top of the piston chamber and forming with the side walls of the chamber an annular piston receiving space and with the top of the chamber an air-retaining space entirely closed at the top and sides and opening downwardly within the hollow piston, substantially as described.

6. A flushing valve having, in combination, a main valve, a water check comprising a hollow piston connected to and moving with the main valve, a downwardly opening piston chamber closed at the top and loosely receiving the piston, a thimble secured in said chamber and forming with the side walls of the chamber an annular piston-receiving space and with the top of the chamber an air-retaining space entirely closed at the top and sides and opening downwardly within the hollow piston, said air-retaining space being continued and enlarged above the top of the thimble to retain a large air bubble, substantially as described.

7. A flushing valve having, in combination, a main valve having a surface exposed to water under pressure tending to close the valve, a preliminary valve connected with the main valve to move therewith and coöperating with a diaphragm so as to restrict the flow of water to the main valve prior to the closure of the latter, a relief valve having an opening larger than such restricted passage for relieving pressure on the main valve, and means for opening the relief valve before the opening of the main valve and for preventing the relief valve from closing before the closing of the main valve, substantially as described.

8. A flushing valve having, in combination, a service valve having a main valve, a preliminary valve and a relief valve for relieving the pressure on the main valve, the main valve closing against a seat, the preliminary valve closing into a diaphragm for restricting the passage to the main valve, and means for operating the service valve having provision by virtue of which in opening the valve the relief valve is first opened and then the main valve is opened, and in closing, operating first to throttle the supply of water to the main valve by the preliminary valve, then closing the main valve and lastly closing the relief valve, substantially as described.

9. A flushing valve having, in combination, a service valve having a main valve, a preliminary valve connected thereto by a hollow stem, and a relief valve for closing the hollow stem, the main valve closing against a seat, the preliminary valve restricting the passage of water to the main valve, and means for operating the service valve having provision for opening the preliminary valve before opening the main valve and for closing the main valve before closing the relief valve, substantially as described.

In testimony whereof I affix my signature, in presence of two witnesses.

CHARLES H. PHILLIPS.

Witnesses:
  HORACE VAN EVEREN,
  ANNIE C. RICHARDSON.